United States Patent Office 3,291,821
Patented Dec. 13, 1966

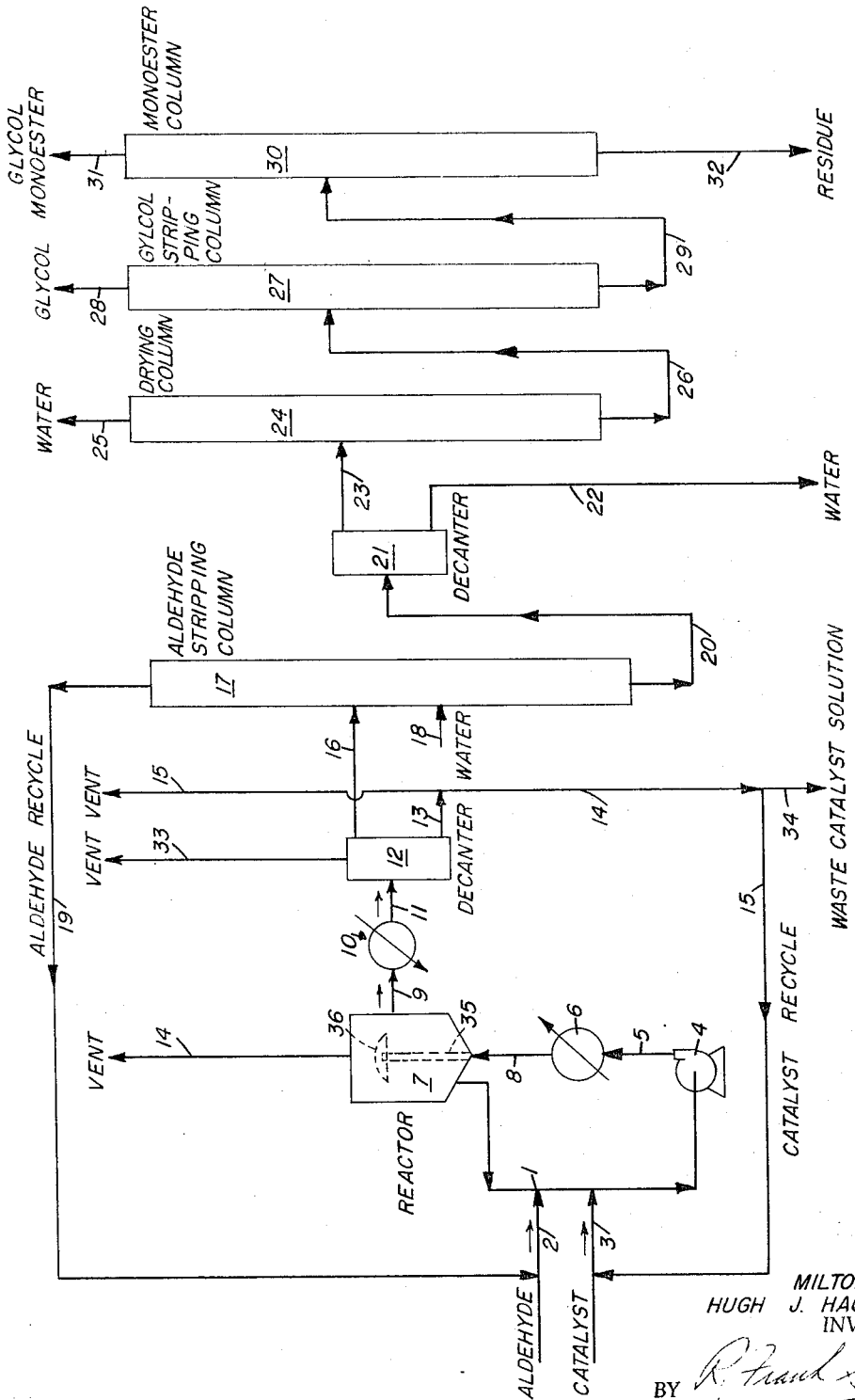

3,291,821
PREPARATION OF GLYCOL MONOESTERS BY CONDENSATION OF ALDEHYDES IN THE PRESENCE OF AN AQUEOUS SOLUTION OF A STRONG INORGANIC BASE
Milton A. Perry and Hugh J. Hagemeyer, Jr., Longview, Tex., assignors to Eastman Kodak Company, Rochester, N.Y., a corporation of New Jersey
Filed Nov. 4, 1963, Ser. No. 321,135
9 Claims. (Cl. 260—494)

This invention relates to a novel chemical process. More particularly this invention relates to a method for preparing glycol monoesters by the hydrous condensation of aldehydes of 4 to 10 carbon atoms having one α-hydrogen atom.

The novel process of the invention comprises the trimeric condensation of the aldehyde of 4 to 10 carbon atoms having one α-hydrogen atom to a glycol monoester by intimately contacting the aldehyde with an aqueous solution of a strong inorganic base. The process of the invention can be represented by the following equation:

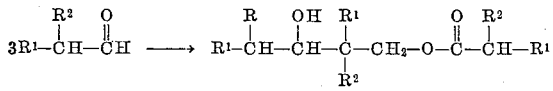

wherein $R^1$ and $R^2$ can be the same or different hydrocarbyl substituents.

The process of the invention employs a novel set of reaction conditions which direct the aldehyde condensation to the formation of the desired glycol monoester as the primary reaction product. The process of the invention comprises intimately contacting an aldehyde having one α-hydrogen atom with an aqueous solution of a strong inorganic base for about 15 minutes to about 2 hours at a temperature of about 50° C. to about 125° C.

The process of our invention can be carried out in a batch or a continuous manner as will be described more fully hereinafter. The sole figure of the drawing is a schematic flow diagram of a continuous embodiment of the process of our invention.

Referring to the drawing, illustrating a continuous embodiment of the process, the aldehyde is continuosly introduced into line 1 of the reactor system via line 2 and the catalyst, i.e., aqueous solution of a strong inorganic base, is continuously introduced into line 1 via line 3. The mixture of aldehyde and aqueous solution is forced by pump 4 via line 5 into heat exchanger 6 where it is heated to reaction temperature. It is then introduced into reactor 7 via line 8 and passes through the vertical conduit 35 from which it is directed against the concave baffle plate 36 to achieve thorough mixing of the aldehyde and aqueous catalyst. Crude reaction product is withdrawn from reactor 7 via line 9 while a portion of the contents of the reactor is recycled via line 1. Pump 4 must have sufficient capacity to provide intimate contact between the organic and aqueous phases in reactor 7.

The crude reaction product is cooled in heat exchanger 10 and passed via line 11 into decanter 12 where the aqueous and organic phases are separated. The aqueous catalyst solution is withdrawn from decanter 12 via line 13 and can be recycled to the reactor system via lines 14 and 15 or discarded through lines 14 and 34. When the catalyst solution is recycled, there is a tendency for water-soluble salts of organic acids to build up in the aqueous catalyst solution. These salts inhibit the formation of the desired glycol monoester and the salt concentration must therefore be controlled. A convenient method of controlling the salt concentration in the catalyst solution is to discard a portion of the catalyst solution through line 34 and recycle only the remainder through line 15. Enough fresh catalyst solution is added through line 3 to maintain the desired volume ratio of organic to aqueous phases in the reactor system. The salt concentration in the catalyst solution should be less than 10% of the solution by weight and preferably less than 5% of the solution by weight.

The contact time between the organic phase and the aqueous phase can be varied by control of the feed rates of aldehyde through line 2 and catalyst solution through line 3 and control of the withdrawal rate of the crude product through line 9.

The reactor system is preferably blanketed with an inert gas such as nitrogen. The inert gas can be vented from the system via lines 14, 15 and 33.

The decanted crude organic product is withdrawn from decanter 12 and introduced into the aldehyde stripping column 17 by means of line 16. Water is introduced into aldehyde stripping column 17 by line 18 and any unreacted aldehyde and aldol is removed overhead by azeotropic distillation and recycled to the reactor system by means of line 19.

The bottoms comprising glycol monoester, glycol and water are removed from aldehyde stripping column 17 via line 20 and introduced into decanter 21 where the aqueous and organic phases are separated. The aqueous phase is removed from decanter 21 and discarded via line 22. The organic phase from decanter 21 is removed and introduced into drying column 24 via line 23. Water and low boilers are removed overhead from drying column 24 and discarded via line 25. The bottoms are removed from drying column 24 and introduced into glycol stripping column 27 via line 26. Any glycol is removed overhead via line 28 and the bottoms, principally comprising glycol monoester, are introduced into monoester column 30 by line 29. The product glycol monoester is recovered overhead from monoester column 30 via line 31 while any residue is removed and discarded via line 32.

The aldehydes which are useful in the process of the invention are those of the formula:

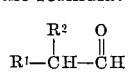

wherein $R^1$ and $R^2$ can be the same or different hydrocarbyl substituents. The hydrocarbyl substituents can each have from 1 to 7 carbon atoms and collectively can have from 2 to 8 carbon atoms and can be alkyl, cycloalkyl or aryl.

The alkyl groups $R^1$ and $R^2$ can include straight and branched chain aliphatic alkyl groups such as methyl, ethyl, propyl, butyl, pentyl, hexyl, heptyl, isopropyl, sec-butyl, isobutyl, 2-methylbutyl, 2-ethylbutyl, 4-methylpentyl, etc.

Included among the useful cycloalkyl groups which the hydrocarbyl substituents $R^1$ and $R^2$ can be are substituents such as cyclopropyl, cyclobutyl, cyclopentyl, cyclohexyl, cycloheptyl, etc.

The substituents $R^1$ and $R^2$, when aryl groups, can be mononuclear aryl groups such as phenyl and tolyl.

In a preferred embodiment of the invention, the hydrocarbyl substituents $R^1$ and $R^2$ are lower alkyl, e.g., straight or branched chain alkyl of 1 to about 4 carbon atoms.

Examples of useful aldehydes with a single α-hydrogen atom includes aldehydes such as isobutyraldehyde, 2-methylbutyraldehyde, 2-ethylbutyraldehyde, 2-ethylpentaldehyde, 2-ethyl hexaldehyde, 2-propylpentaldehyde, 2-propylhexaldehyde, 2-buytlhexaldehyde, 2-cyclopropylpropionaldehyde, 2-cyclobutylpropionaldehyde, 2-cyclopentylbutyraldehyde, 2 - cyclohexylpropionaldehyde, 2-phenylpropionaldehyde, 2 - phenylbutyraldehyde, 2 - (p-tolyl)propionaldehyde, etc.

The trimetric condensation of the aldehyde to the glycol monoester takes place in the presence of an aqueous solution of a strong inorganic base. The aqueous solution of the strong inorganic base should contain about 5 weight percent to 20 weight percent hydroxyl ion, calculated as sodium hydroxide. The strong inorganic bases useful in the process of the invention are alkali metal hydroxides and alkaline earth metal hydroxides with the alkali metal hydroxides being preferred. In a preferred embodiment of our invention, the aqueous solution of a strong inorganic base contains about 10% by weight hydroxyl ion calculated as sodium hydroxide. For reasons of economy and convenience, sodium hydroxide is a preferred alkali metal hydroxide for use in the process of the invention.

The ratio of the volume of the organic phase to the volume of the aqueous phase is not critical and can be varied over a wide range within the scope of the invention. In general, an organic phase to aqueous phase ratio by volume of from about 85:15 to about 75:25 is preferred for most of the aldehydes useful in the process of the invention. However, higher or lower organic phase to aqueous phase ratios can be used, e.g., from about 90:10 to about 50:50.

The time that the aldehyde is contacted with the aqueous solution of the strong inorganic base is important. If too short a contact time is used, the conversion of aldehyde to glycol monoester is low. If the contact time is too long, the yields of the desired glycol monoester are low. In general, contact times of about 15 minutes to about 2 hours are satisfactory. For best results the preferred contact times range from about 30 minutes to about 1 hour.

The temperature at which the aldehyde is contacted with the aqueous solution of a strong inorganic base is also of major importance. We have found that the yield of the desired glycol monoester is low if the contact temperature is either too low or too high. Satisfactory operating temperatures are from about 50° C. to about 125° C.

The higher temperatures in the above range are preferred for useful aldehydes of higher molecular weight whereas the lower temperatures are preferred for the aldehydes of lower molecular weight. In general, temperatures of about 60° C. to about 75° C. are preferred.

It is essential to the process of the invention that the aldehyde having one α-hydrogen atom be intimately contacted with the aqueous solution of the strong inorganic base.

The intimate contact between the organic phase and aqueous phase should be so complete as to form what we call a "pseudo emulsion." The "pseudo emulsion" is a reversible dispersion of one of the phases within the other. The two phases, though intimately contacted, separate from each other in a reasonable length of time, e.g. about 30 mins., and are capable of being separated by decanting.

The process can be carried out in a batch or in a continuous manner. If a batch process is employed the intimate contact between the aldehyde and the aqueous solution can be provided by violently agitating the contents of the reaction vessel, e.g., by means of an agitator within the reaction vessel or by shaking the reaction vessel itself. The contents of the reaction vessel should be maintained at the desired reaction temperature and agitated for the desired reaction time. After the reaction time has elapsed, the crude reaction product comprises an aqueous phase and an organic phase which can be separated by decanting. The glycol monoester can be recovered from the organic phase by distillation.

However, for reasons of economy and ease of operation, it is preferred to carry out the process of the invention in a continuous manner.

The following examples illustrate the process of the invention.

EXAMPLE 1

To a pump-around system of approximately 2-liter total capacity was added 200 ml. of 10 percent sodium hydroxide. This solution was heated to 65° C. and circulation started. Eight hundred milliliters of isobutyraldehyde decanted from its azeotrope was added to the reactor over a 15-minute period in a continuous fashion. Then the reaction mixture was withdrawn and fresh isobutyraldehyde feed was added along with recycle aqueous caustic and make-up caustic. The feed rates and take-off rates were adjusted to give a contact time of 15 minutes. The product was decanted and the aqueous layer partially recycled and partially ditched. The organic layer was azeotroped with fresh water to break down aldol and take overhead all unreacted isobutyraldehyde. Analysis of the residual organic layer showed it to be 9 percent 2,2,4-trimethyl-1,3-pentanediol and 80 percent 3-hydroxy-2,2,4-trimethylpentyl isobutyrate. The monoester was obtained pure by reduced pressure fractionation to give an over-all yield of 78 percent to the ester, boiling point 103–105° at 2 mm. The conversion to 2,2,4-trimethyl-1,3-pentanediol was 8.3 percent.

EXAMPLE 2

A series of experiments was carried out as in Example 1, varying the feed rates so as to study the effect of holdup time. The results are presented in Table I.

Table I

| Holdup Time | Yield of Free Diol | Yield of Mono-Ester |
| --- | --- | --- |
| 15 minutes | 8.3 | 78.0 |
| 30 minutes | 9.0 | 91.3 |
| 1 hour | 10.0 | 90.5 |
| 2 hours | 22.6 | 62.2 |

EXAMPLE 3

2-methylbutyraldehyde was used in place of isobutyraldehyde and the reaction was carried out as in Example 1. 3-hydroxy-2-ethyl-2,4-dimethylhexyl 2-methylbutyrate was obtained in 64 percent yield using a reaction time of 15 minutes. 2-ethyl-2,4-dimethyl 1,3-hexanediol was obtained in 6 percent yield.

EXAMPLE 4

Ten moles of isobutyraldehyde were added to a solution of 10 percent sodium hydroxide over a 15-minute period. The reaction temperature was maintained at 65–70° C. by alternate heating and cooling. After addition was complete, the reaction mixture (80 percent organic 20 percent aqueous) was vigorously stirred for 30 additional minutes and rapidly cooled. The aqueous and organic layers were separated mechanically and the organic layer was azeotroped with fresh water. Six moles of isobutyraldehyde were recovered as the isobutyraldehyde azeotrope. The residual organic layer was separated, dried, and distilled under reduced pressure to give 0.12 mole of 2,2,4-trimethyl-1,3-pentanediol and 1.20 moles of 3-hydroxy-2,2,4-trimethylpentyl isobutyrate.

Thus by the process of the invention, we have by a novel combination of reactants and reaction conditions provided a method that is useful for the preparation, in high yields, of glycol monoesters.

The glycol monoesters prepared by the process of the invention are valuable intermediates in the preparation of a number of important products. For instance, they can be esterified in the presence of metallic esterification catalysts to yield esters that are useful as plasticizers, lubricants, solvents and the like.

The invention has been described in considerable detail with particular reference to certain preferred embodiments thereof, but it will be understood that variations and modifications can be effected within the spirit

We claim:
1. The process of continuously preparing a glycol monoester of the formula:

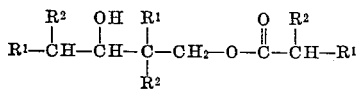

which comprises continuously and intimately contacting an aldehyde of 4 to 10 carbon atoms having the formula:

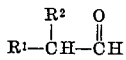

with an aqueous solution containing a strong base selected from the group consisting of alkali metal hydroxides and alkaline earth metal hydroxides, the hydroxyl ion concentration of said aqueous solution, calculated as sodium hydroxide, being about 5 to about 20 weight percent, the volumetric ratio of said aldehyde to said aqueous solution being from about 90:10 to about 50:50, for about 15 minutes to about 2 hours at a temperature of about 50° C. to about 125° C. wherein each of $R^1$ and $R^2$ is a hydrocarbyl radical of 1 to 7 carbon atoms.

2. The process of claim 1 in which each of $R^1$ and $R^2$ is a hydrocarbyl radical of 1 to 7 carbon atoms selected from the group consisting of alkyl, cycloalkyl, and aryl.

3. The process of claim 2 wherein the aldehyde is isobutyraldehyde.

4. The process of claim 2 wherein the aldehyde is 2-methylbutyraldehyde.

5. The process of continuously preparing a glycol monoester of the formula:

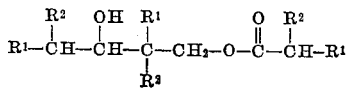

which comprises continuously and intimately contacting an aldehyde of 4 to 10 carbon atoms having the formula:

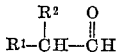

with an aqueous solution of an alkali metal hydroxide, the hydroxyl ion concentration of said aqueous solution calculated as sodium hydroxide, being about 5 to about 20 weight percent, the volumetric ratio of said aldehyde to said aqueous solution being from about 85:15 to about 75:25, for about 30 minutes to about 1 hour at a temperature of about 60° C. to about 75° C. wherein each of $R^1$ and $R^2$ are lower alkyl.

6. The process of claim 5 wherein the aldehyde is isobutyraldehyde.

7. The process of claim 5 wherein the aldehyde is 2-methylbutyraldehyde.

8. The process of claim 5 wherein the aldehyde is isobutyraldehyde and the alkali metal hydroxide is sodium hydroxide.

9. The process of claim 5 wherein the aldehyde is 2-methylbutyraldehyde and the alkali metal hydroxide is sodium hydroxide.

References Cited by the Examiner

FOREIGN PATENTS 646,482   5/1937   Germany.

OTHER REFERENCES

Adams et al., Organic Reactions, vol. II, 1944, pages 98–100 and 110.

LORRAINE A. WEINBERGER, *Primary Examiner.*

LEON ZITVER, *Examiner.*

D. P. CLARKE, V. GARNER, *Assistant Examiners.*